(12) United States Patent
Schumacher (10) Patent No.: US 8,404,030 B2
(45) Date of Patent: Mar. 26, 2013

(54) PROPELLER DRIVEN SELF-RENEWING AIR FILTER

(75) Inventor: Jerry H Schumacher, Boone, NC (US)

(73) Assignee: MLS Innovations LLC, Zebulon, NC (US)

( * ) Notice: Subject to any disclaimer, the term of this patent is extended or adjusted under 35 U.S.C. 154(b) by 320 days.

(21) Appl. No.: 12/875,450

(22) Filed: Sep. 3, 2010

(65) Prior Publication Data
US 2012/0055339 A1  Mar. 8, 2012

(51) Int. Cl.
*B01D 46/00* (2006.01)
(52) U.S. Cl. ........... 95/277; 95/1; 95/19; 95/26; 55/351; 55/352; 55/354; 55/422; 55/506; 96/421; 96/423; 96/429
(58) Field of Classification Search ............ 55/352, 55/354, 351, 422, 495, 506, 528; 95/277, 95/1, 19, 26; 96/429, 421, 423
See application file for complete search history.

(56) References Cited

U.S. PATENT DOCUMENTS

| | | | |
|---|---|---|---|
| 3,572,016 A | 3/1971 | Neumann | |
| 4,054,521 A | 10/1977 | Winzen | |
| 4,174,205 A | 11/1979 | Koushiafes | |
| 4,221,576 A | 9/1980 | Phillips | |
| 4,470,833 A | 9/1984 | Wolfe | |
| 4,627,863 A | 12/1986 | Klein | |
| 4,826,596 A | 5/1989 | Hirs | |
| 4,925,560 A | 5/1990 | Sorrick | |
| 6,152,998 A | 11/2000 | Taylor | |
| 6,168,646 B1 | 1/2001 | Craig | |
| 6,402,822 B1 | 6/2002 | Najm | |
| 6,596,059 B1 | 7/2003 | Greist | |
| 6,632,269 B1 | 10/2003 | Najm | |
| 6,843,834 B2 | 1/2005 | Schumacher | |
| 7,608,121 B2 | 10/2009 | Boyer | |
| 7,785,382 B2 | 8/2010 | Morton | |
| 7,794,529 B2 | 9/2010 | Lo | |
| 8,182,588 B2 | 5/2012 | Morton | |
| 2012/0055339 A1 | 3/2012 | Schumacher | |

*Primary Examiner* — Jason M Greene
*Assistant Examiner* — Karla Hawkins
(74) *Attorney, Agent, or Firm* — Sturm & Fix LLP (57) ABSTRACT

A method for renewing a sheet-type filtering material to a flowing gas stream inside a conduit by converting some of the energy of a flowing gas stream traversing the filter assembly to rotate a propeller and the propeller shaft. The rotational energy from the propeller shaft is operably coupled to a gear that causes a supply of unused sheet-type filter material on a first side of the filter assembly top move across the filter assembly to a second side of the filter assembly, so that the portion of the sheet-type filtering material in a position to filter a flowing gas stream changes over time as the flowing gas stream rotates the propeller.

5 Claims, 6 Drawing Sheets

PROPELLER DRIVEN SELF-RENEWING AIR FILTER

BACKGROUND OF THE INVENTION

1. Field of the Invention

The present invention relates generally to air filtration. More particularly the present invention relates to a method and apparatus for an air filter that renews itself, automatically greatly reducing the time required for replacement.

2. Background Art

Filters for furnaces and air conditioning equipment are typically rigid, framed units (for residential and commercial applications) or in the form of sheets that are stretched between rolls on either side of an air duct (for commercial and industrial applications). Rigid, framed filters are time consuming to replace. As for the sheet-type filters used in commercial and industrial applications, one of the rolls (on one side of the air duct) is drivable. It may use a stepper motor or may be hand-cranked. In the former case, there is significant expense associated with an automatically controlled filter. In the latter, although some manpower is conserved, the filters still need regular attention.

The timing for replacing or renewing filters is important. Dirty filters result in less flow rate of air which translates to less heat exchange in the HVAC equipment. The equipment must run longer to accomplish the intended goal, and air conditioning equipment may freeze up due to inadequate heat exchange.

There is, therefore, a need for a method and apparatus for providing for a self-renewing air filter for HVAC applications. There is a further need for a self-renewing air filter that renews on demand, that is, when it has become sufficiently dirty to restrict air flow.

U.S. Pat. No. 6,843,834 issued Jan. 18, 2005 "Self-Renewing Air Filter", which is incorporated herein by reference in its entirety, will not work for a constant flow furnace because it uses a ratchet type advancing system that requires that the air flow starts and stops at times. Accordingly, there is a need for a self-renewing air filter which will work in constant flow air filtering equipment.

Gearboxes have been used for decades to transfer power from a source of power to the place where the power has been used. Rotary power can be geared down with a gearbox so a rotary input can be used to transmit power to a slower and more powerful output, or rotary power can be geared up with a gearbox so a rotary input can be used to transmit power to a faster and less powerful output. But there is a need for gearboxes that are more efficient and easier for the user to understand.

SUMMARY OF THE INVENTION

A purpose of this invention is to provide a method and apparatus for providing filtering in air-handling units in Heating, Ventilating, and Air Conditioning (HVAC) equipment that renews itself (without human intervention) for both intermittent and constant flow systems and does so as it becomes dirtied. An additional purpose of this invention is to provide the same filtering for other filtering needs such as paint booths; engine air filters for gas turbines, diesel and gasoline engines; and cabin air in automobiles.

It is possible to arrange the filter sheet so it is stretched between the gathering roll and the dispensing roll. The dispensing roll must be restricted from turning freely. This can be accomplished using friction, applied to the roll itself, or to the filter sheet wound around the dispensing roll.

A propeller or equivalent structure is disposed in the air stream up stream of the filter sheet, the rotation of which is transferred to a gearbox for causing the filter sheet to move between the dispensing roll and the gathering roll at an average speed approximately proportional to the flow of air at the propeller or equivalent structure.

The novel features which are believed to be characteristic of this invention, both as to its organization and method of operation together with further objectives and advantages thereto, will be better understood from the following description considered in connection with the accompanying drawings in which a presently preferred embodiment of the invention is illustrated by way of example. It is to be expressly understood however, that the drawings are for the purpose of illustration and description only and not intended as a definition of the limits of the invention.

BEST MODE FOR CARRYING OUT THE INVENTION

Figure 1:
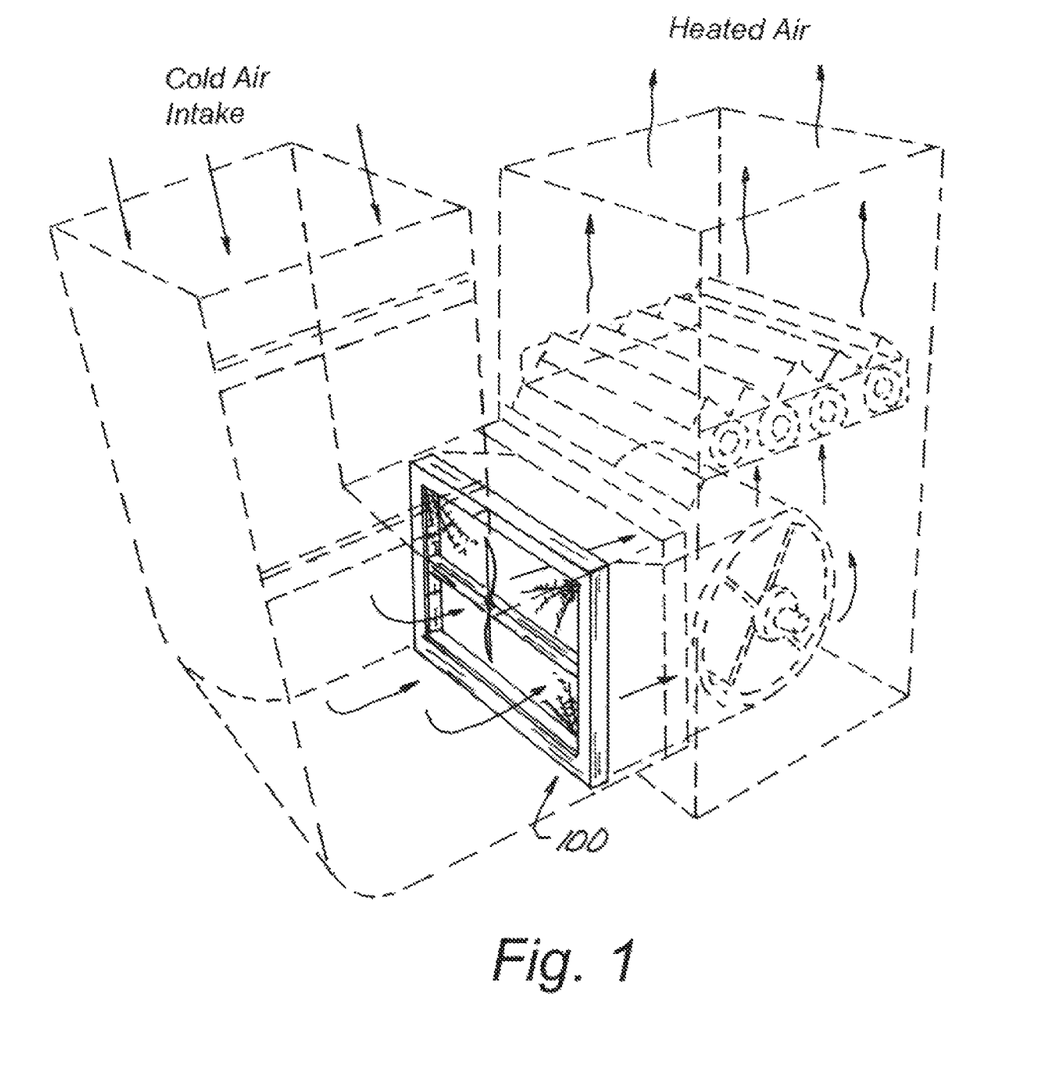
FIG. 1 shows a perspective view of a self-renewing air filter assembly inside an air passageway for a furnace with the furnace parts in dashed lines show the environment of the present invention.

A self-renewing air filter assembly 100 is shown in place inside a furnace duct in FIG. 1, the furnace parts being shown in dashed lines. According to the preferred embodiment, the self-renewing filter assembly 100 is in a vertical orientation, however, this invention is not limited to that orientation.

Figures 2, 3, 4, 5:
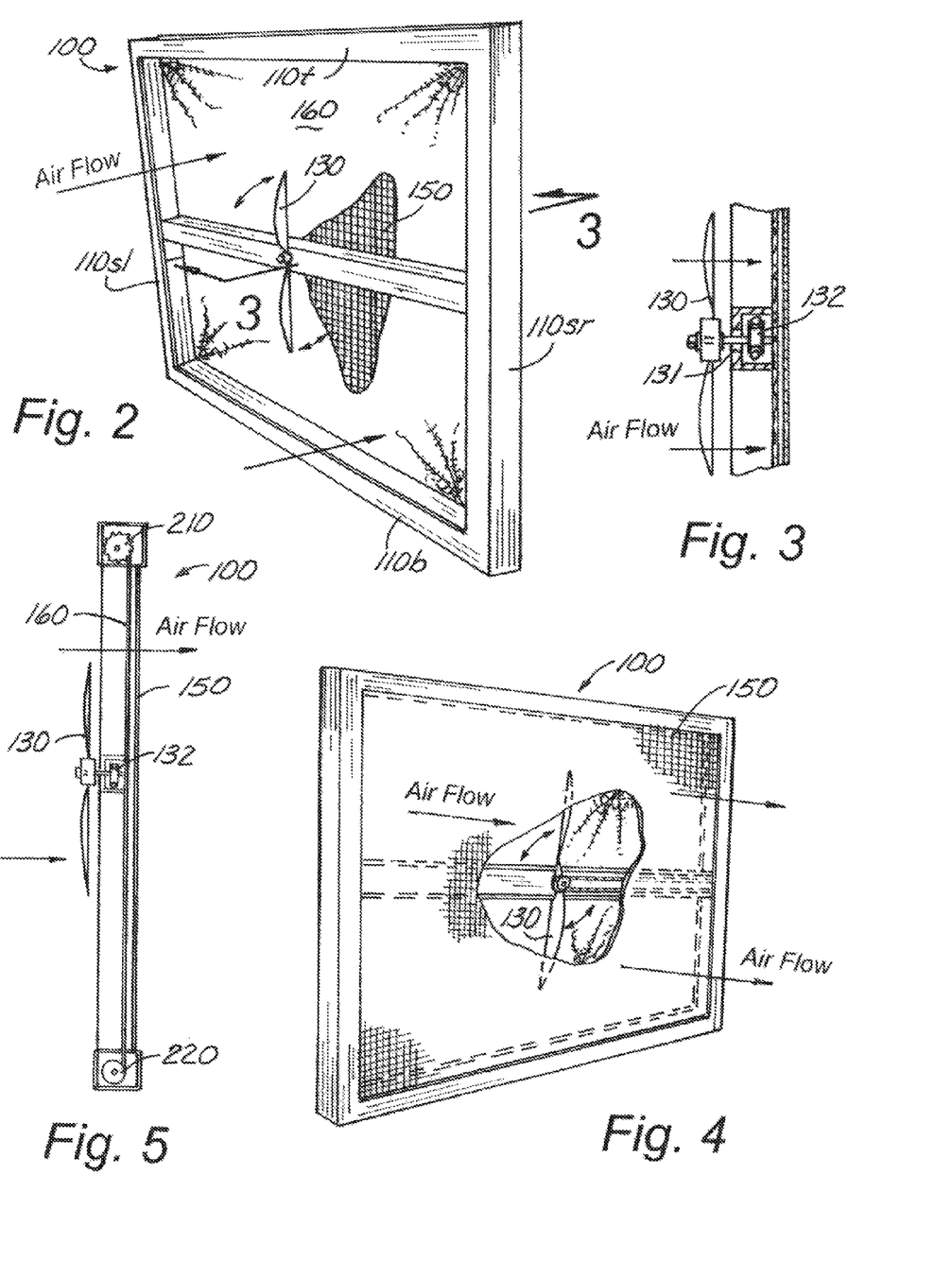
FIG. 2 shows a first perspective view of a self-renewing air filter assembly.
FIG. 3 shows a partial enlarged cross sectional view taken along line 3-3 of FIG. 2.
FIG. 4 shows a second perspective view of a preferred embodiment of the self-renewing air filter assembly of the present invention.
FIG. 5 shows a side cross sectional view taken along line 3-3 of FIG. 2 of a self-renewing air filter assembly with the filter sheet and arrows showing the direction of air flow.

FIG. 2 shows a frame with top, bottom, right side and left side members 110$t$, 110$b$, 110$sr$ and 110$sl$ respectively. A center brace 120 is attaches at one end to right side member 110$sr$ and at the other end to left side member 110$sl$.

Figure 6:
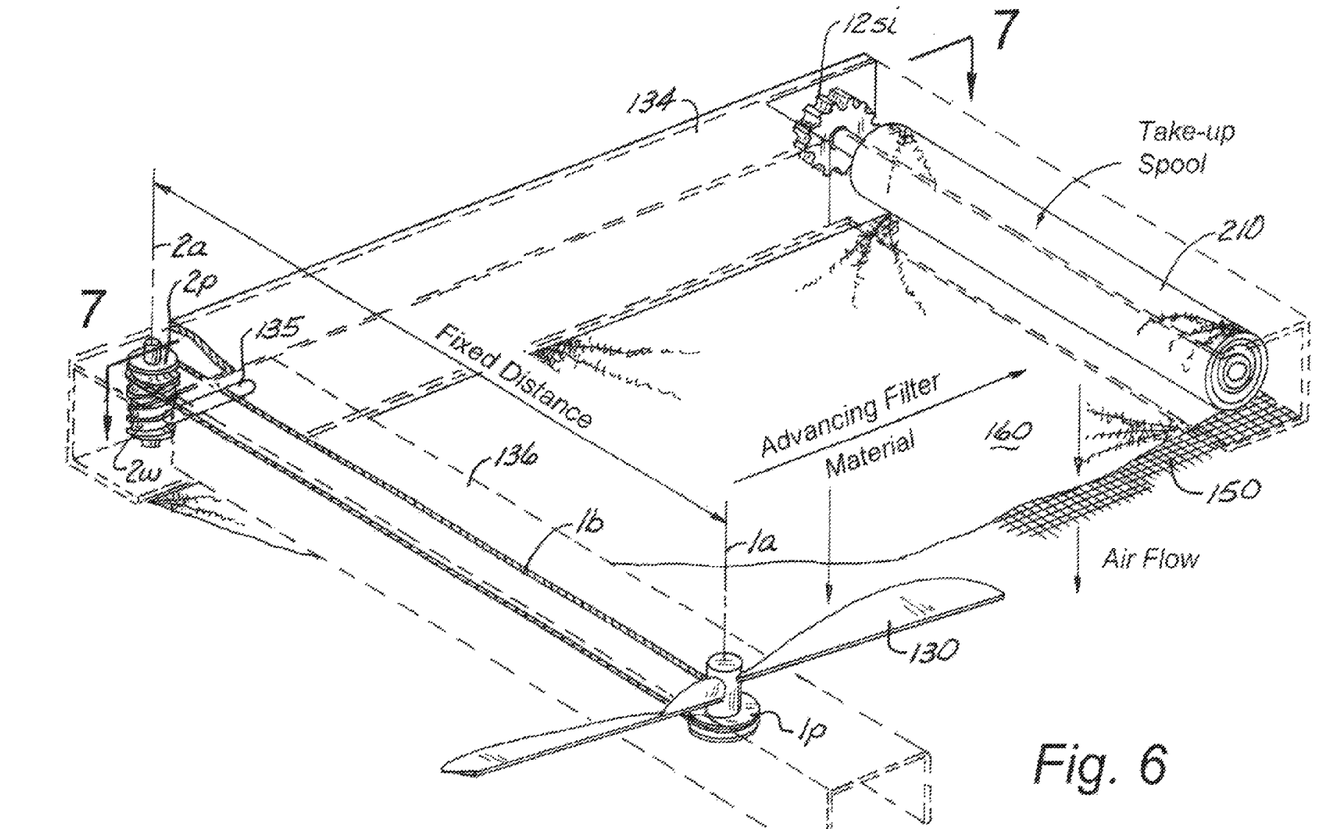
FIG. 6 shows an enlarged perspective view of the preferred embodiment with parts broken away to show the working parts.

FIGS. 2-6 show a propeller 130 is rotatably mounted to the center brace 120 by a bearing 131 as shown in FIG. 3. A pulley 1$p$ is rigidly attached to the pulley so as to rotate with the propeller 130. FIGS. 2-6 also show a screen 150 which is attached to the frame members 110*t*, 110*b*, 110*sr* and 110*sl* to keep the filter material 160 approximately planer by supporting the back side of the filter material 160 but still allowing the fluid, such as air, to pass there through. A brace 136, shown in FIG. 6, is attached at one end to frame part 110*sr* and 110*sl* for mounting the pulley 1*p* and propeller 130.

Another pulley 2*p* is attached to one end of a gear box 134. A slot 135 is disposed in the gearbox housing 134 which allows for a belt 1*b* to pass through the opening 135 and thereby be trained around pulley 1*p* on one end and pulley 2*p* on the other end of the belt 1*b*. Accordingly, as the propeller 130 rotates due to air impinging on it, that motion turns pulley 1*p*, belt 1*b* and pulley 2*p*. That motion is passed on to the gears in the gearbox and such motion ultimately rotates the gathering (or take-up) roll 210 as will be explained in detail below.

Another view of the self-renewing air filter assembly 100 is shown in FIG. 5. The end of the gathering roll 210 and the end of the dispensing roll 220 can be seen.

Figure 7:
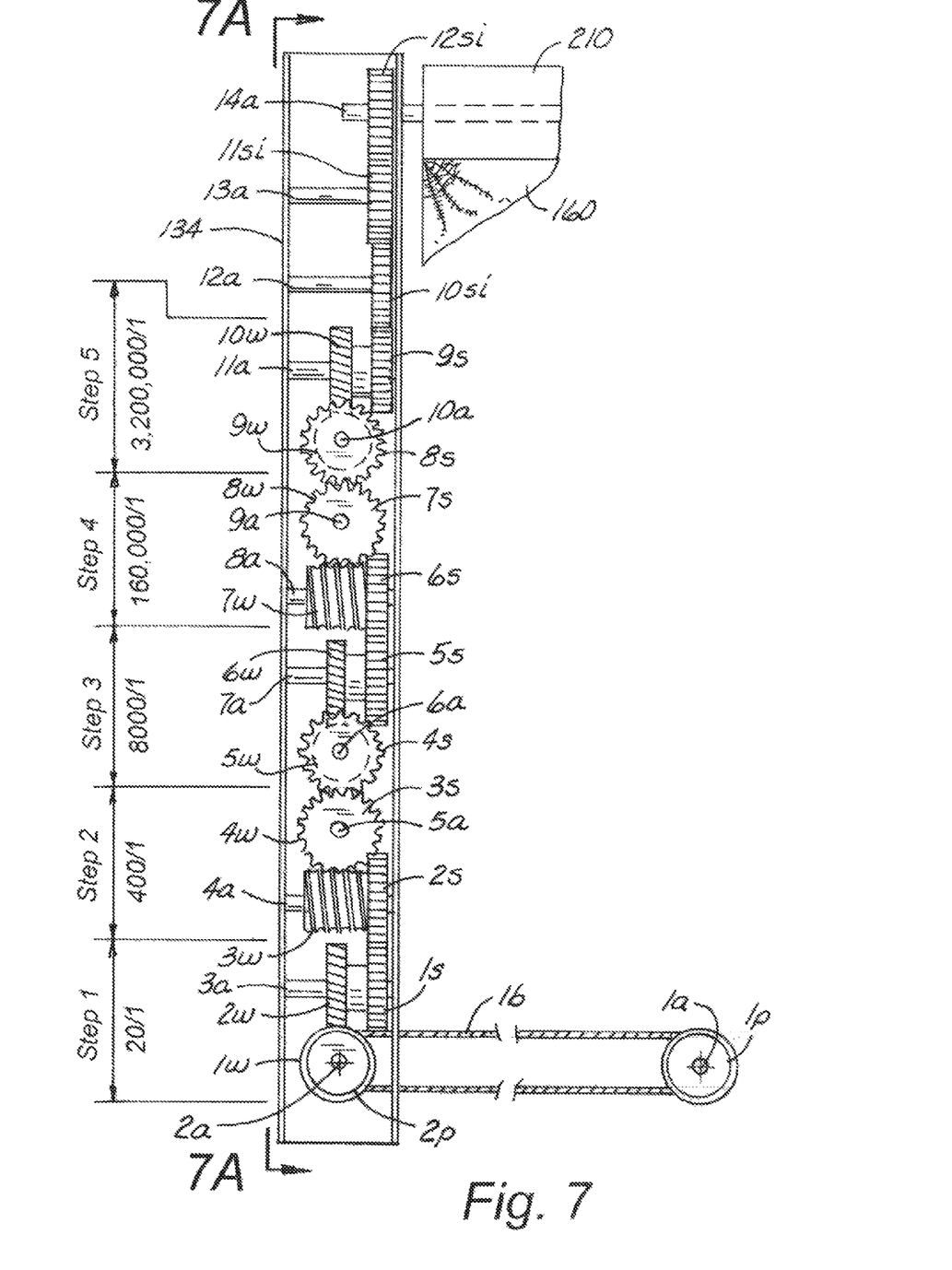
FIG. 7 shows the drive train and gear box parts that pass the rotary motion of a propeller shown in FIGS. 1-5 to the take-up or gathering roll for the filter sheet.
Figure 7A:
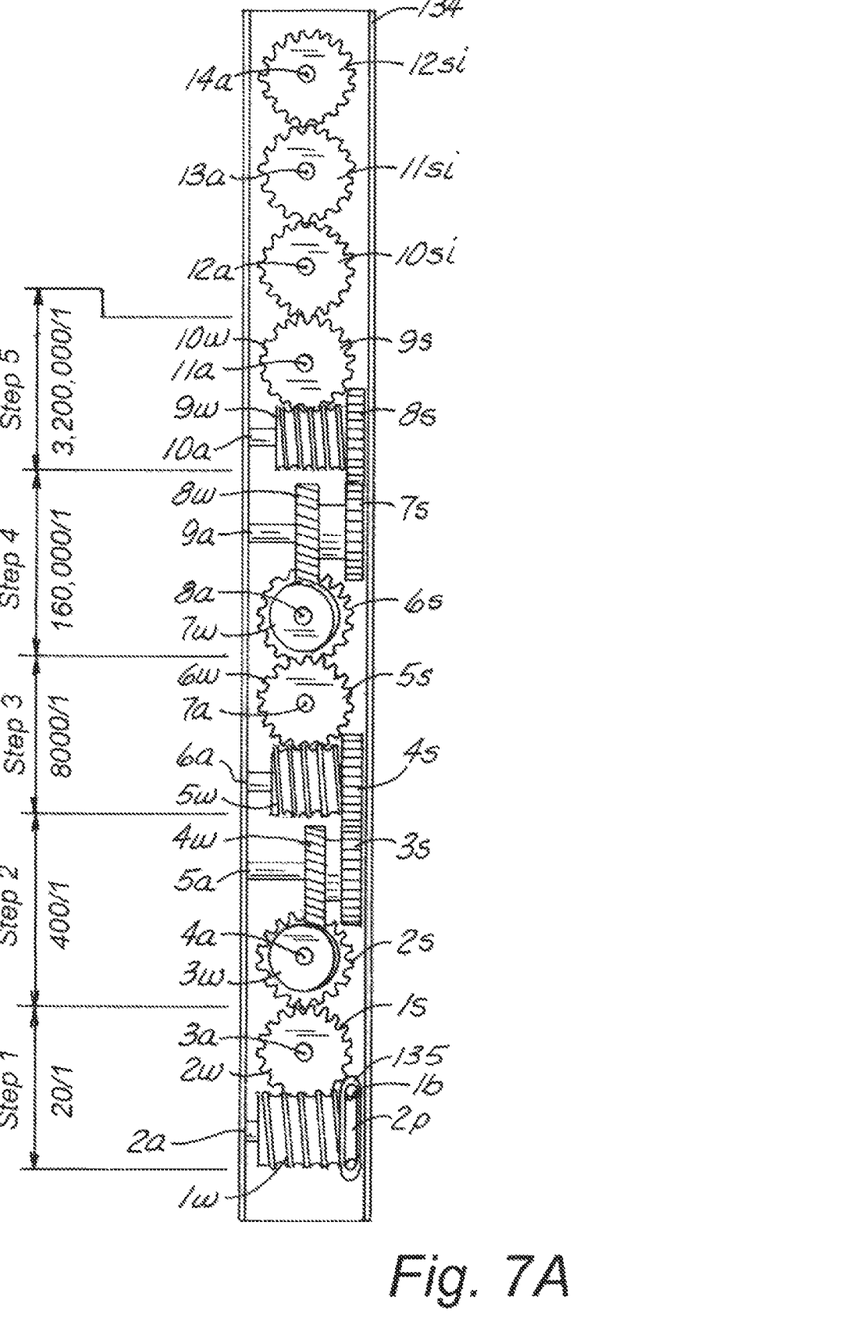
FIG. 7A is a view along line 7A-7A of FIG. 7 and also shows the drive train and gear box parts that pass the rotary motion of a propeller shown in FIGS. 1-5 to the take-up or gathering roll for the filter sheet.

The gearbox 160 contains everything shown in FIGS. 7 and 7A and in general can be summarized by saying that it takes the motion of the propeller 130, belt 1*b* and pulley 2*p* and passes that motion and power ultimately on to turn the gathering roll 210, but with more torque, less speed and more power than the torque, speed and power generated by the propeller 130.

The apparatus 100 for renewing a sheet-type filtering material in a flowing fluid inside a conduit of a furnace is shown in FIGS. 1-7. This flow applies a force to a force transferring device to ultimately cause movement of the sheet-type filtering material 160.

A gathering roll 210 to which one end of the sheet-type filtering material is attached has a frame 110*t*, 110*b*, 110*sr* and 110*sl* for stretching the sheet-type filtering material 160 across the conduit. A force gathering device, such as propeller 130 rotates due to the air passing over it. A gearbox 133 operatively attached at one end to the force gathering device 130 and is operatively attached at the other end to the gathering roll 210 to advance the sheet-type filtering material 160 across the conduit such that clean filtering material 160 is exposed to the fluid flow. A second end of the sheet-type filtering material is operatively attached to a dispensing roll 220.

A friction member (not shown) can be biased against the dispensing roll 220 for restricting the turning of the dispensing roll 220 whereby the sheet-type filtering material 160 will tend to stay stretched between the gathering 210 and dispensing roll 220.

The propeller 130 is a fluid driven propeller operatively attached about a first axis (1*a*) of rotation to the conduit. A first pulley (1*p*) is operatively attached to and rotatable with the propeller 130 about the first axis of rotation (1*a*) of the propeller 130. A second pulley (2*p*) operatively rotatably attached to the gearbox about a second axis (2*a*) of rotation.

A flexible belt (1*b*) trained around the first (1*p*) and second (2*p*) pulleys whereby rotation of the propeller imparts rotation to the second pulley (2*p*).

A first worm (1*w*) gear rigidly is operatively attached to the second pulley (2*p*) for rotation with the second pulley (2*p*) about the second axis (2*a*) of rotation. A second worm gear (2*w*) operatively rotatably attached to the gearbox about a third rotational axis (3*a*), the second worm gear (2*w*) being operatively meshing with the first worm gear (1*w*) whereby rotation of the first worm gear (1*w*) causes the second worm gear (2*w*) to rotate.

A first spur gear (1*s*) is rigidly operatively rigidly attached to the second worm (2*w*) gear for rotation with the second worm gear (2*w*) about the third axis of rotation (3*a*). A second spur gear (2*s*) is operatively rotatably attached to the gearbox about a fourth rotational axis (4*a*), the second spur gear (2*s*) being operatively meshing with the first spur gear (1*s*) whereby rotation of the first spur gear (1*s*) causes the second spur gear (2*s*) to rotate about the fourth rotational axis (4*a*) wherein the gathering roll is operatively attached to the second spur gear (2*s*) via other gears to cause the gathering roll to rotate in response to rotation of the propeller.

A third worm gear (3*w*) is rigidly operatively attached to the second spur gear (2*s*), the third worm gear (3*w*) also being operatively rotatably attached to the gearbox about the fourth rotational axis (4*a*). A fourth worm gear (4*w*) is operatively rotatably attached to the gearbox about a fifth rotational axis (5*a*), the fourth worm (4*w*) gear being operatively meshing with the third worm gear (3*w*) whereby rotation of the third worm gear (3*w*) about the fourth axis causes the fourth worm gear (4*w*) to rotate about the fifth axis (5*a*).

A third spur gear (3*s*) is rigidly operatively rigidly attached to the fourth worm gear (4*w*) for rotation with the fourth worm gear about the fifth axis of rotation (5*a*) and a fourth spur gear (4*s*) is operatively rotatably attached to the gearbox 134 about a sixth rotational axis (6*a*), the fourth spur gear (4*s*) being operatively meshing with the third spur gear (3*s*) whereby rotation of the third spur gear (3*s*) causes the fourth spur gear (4*s*) to rotate about the sixth rotational axis (6*a*).

A fifth worm gear (5*w*) is rigidly operatively rigidly attached to the fourth spur gear (4*w*), the fifth worm gear (5*w*) also being operatively rotatably attached to the gearbox about the sixth rotational axis (6*a*) and a sixth worm gear (6*w*) is operatively rotatably attached to the gearbox 134 about a seventh rotational axis (7*a*), the sixth worm gear (6*w*) being operatively meshing with the fifth worm gear (5*w*) whereby rotation of the fifth worm gear (5*w*) about the sixth rotational axis (6*a*) causes the sixth worm (6*w*) gear to rotate about a seventh rotational axis (7*a*).

A sixth worm gear (6*w*) is operatively rotatably attached to the gearbox 134 about a seventh rotational axis (7*a*), the sixth worm gear (6*w*) being operatively meshing with the fifth worm gear (5*w*) whereby rotation of the fifth worm gear (5*w*) causes the sixth worm gear (6*w*) to rotate about the seventh rotational axis (7*a*).

A fifth spur gear (5*s*) is rigidly operatively rigidly attached to the sixth worm (6*w*) gear for rotation with the sixth worm gear (6*w*) about the seventh axis of rotation (7*a*) and a sixth spur gear (6*s*) is operatively rotatably attached to the gearbox 134 about an eighth rotational axis (8*a*), the sixth spur gear (6*s*) being operatively meshing with the fifth spur gear (5*s*) whereby rotation of the fifth spur gear (5*s*) causes the sixth spur gear (6*s*) to rotate about the eighth rotational axis (8*a*).

A seventh worm gear (7*w*) is rigidly operatively attached to the sixth spur gear (6*s*), the seventh worm gear (7*w*) also being operatively rotatably attached to the gearbox about the eighth rotational axis (8*a*) and an eighth worm gear (8*w*) operatively rotatably attached to the gearbox about a ninth rotational axis (9*a*), the eighth worm (8*w*) gear being operatively meshing with the seventh worm gear (7*w*) whereby rotation of the seventh worm gear (7*w*) about the eighth axis (8*a*) causes the eighth worm gear (8*w*) to rotate about the ninth axis (9*a*).

A seventh spur gear (7*s*) is rigidly operatively rigidly attached to the eighth worm gear (8*w*) for rotation with the eighth worm gear (8*w*) about the ninth axis of rotation (9*a*) and an eighth spur gear (8*s*) operatively rotatably attached to the gearbox about a tenth rotational axis (10*a*), the eighth spur gear (8*s*) being operatively meshing with the seventh spur gear (7*s*) whereby rotation of the seventh spur gear (7*s*) causes the eighth spur gear (8*s*) to rotate about the tenth rotational axis (10*a*).

A ninth worm gear (9*w*) is rigidly operatively rigidly attached to the eighth spur gear (8*s*), the ninth worm gear (9*w*) also being operatively rotatably attached to the gearbox about the tenth rotational axis (10*a*); and a tenth worm gear (10*w*) is operatively rotatably attached to the gearbox about an eleventh rotational axis (11*a*), the tenth worm gear (10*w*) being operatively meshing with the ninth worm gear (9*w*) whereby rotation of the ninth worm gear (9*w*) about the tenth rotational axis (10*a*) causes the tenth worm (10*w*) gear to rotate about the eleventh rotational axis (11*a*).

A ninth spur gear (9*s*) is rigidly attached to the tenth worm gear (10*w*) whereby rotation of the tenth worm gear (10*w*) rotates the ninth spur gear (9*s*) about the eleventh rotational axis (11*a*), a spur gear (12*s*) operatively attached to the gathering roll; and at least one idler spur gear (10*si* or 11*si*) is operatively attached between the ninth spur gear (9*s*) and the spur gear (12*s*) on the gathering roll to thereby turn the gathering roll accordingly.

The at least one idler gear includes a first spur idler gear (10*si*) operatively rotatably attached to the gear box along a thirteenth rotational axis (13*a*) and a second spur idler gear (11*si*) which is operatively rotatably attached to the gear box along a fourteenth rotational axis (14*a*), wherein first spur idler gear (10*si*) is meshed with the ninth spur gear (9*s*) and the second spur idler gear (11*si*); and wherein second spur idler gear (11*si*) is meshed with the tenth spur gear (10*si*) and the spur gear (12*s*) on the gathering roll so that turning of the propeller 130 due to fluid impinging on it causes the gathering roll 210 to turn.

The gearbox 133 and gear train therein in the preferred embodiment shown in FIGS. 7 and 7A operates to cause the take-up or gathering reel 210 to rotate one (1) time for every three million, two hundred thousand (3,200,000) rotations of the propeller 130. The idea here is to use the fast rotation of the propeller 130 to gather the force applied thereto by the fluid passing over it and pass that rotational force on through the gear box 133 to the take up/gathering roll 210 in a more powerful but slower rotational motion of the take up/gathering roll 210.

Step 1:

Looking again to FIGS. 7 and 7A, worm gear 1*w* has twenty teeth, as does worm gear 2*w*. So for every one rotation of the propeller 130, pulley 2*p*, and worm gear 1*w* about the axis 2*a*, worm gear 2*w* and spur gear 1*s* rotate 20 times about axis 3*a*. Spur gear 1*s* also has 20 teeth around its periphery and is rigidly attached to worm gear 2*w*.

Step 2:

Looking again to FIGS. 7 and 7A, spur gear 2*s* rotates one time for every rotation that spur gear 1*s* rotates. Spur gear 2*s* has 20 teeth on it just like spur gear 1*s* has. Worm gear 3*w* is molded in one piece with spur gear 2*s* and also has twenty teeth, as does worm gear 4*w*. So for every one rotation of the spur gear 2*s* and worm gear 3*w* about axis 4*a*, worm gear 4*w* and spur gear 3*s* rotates 20 times about axis 5*a*. Spur gear 4*s* also has 20 teeth around its periphery and is rigidly attached to worm gear 5*w*, which also has 20 teeth on it. So now, after step 2, for every one (1) rotation of the propeller 130, rotation about axis 5*a* is 400 revolutions (20×20).

Step 3:

Still looking at FIGS. 7 and 7A, spur gear 4*s* rotates one time for every rotation that spur gear 3*s* rotates. Spur gear 4*s* has 20 teeth on it just like spur gear 3*s* has. Worm gear 5*w* is molded in one piece with spur gear 4*s* and also has twenty teeth. So for every one rotation of the spur gear 4*s* and worm gear 5*w* about axis 6*a*, worm gear 6*w* and spur gear 5*s* rotates 20 times about axis 7*a*. Spur gear 5*s* also has 20 teeth around its periphery and is rigidly attached to worm gear 6*w*, which also has 20 teeth on it. So now, after step 3, for every one (1) rotation of the propeller 130, rotation about axis 7*a* is 8000 revolutions (20×20×20).

Step 4:

Still looking at FIGS. 7 and 7A, spur gear 5*s* rotates one time for every rotation that spur gear 6*s* rotates. Spur gear 6*s* has 20 teeth on it just like spur gear 5*s* has. Worm gear 7*w* is molded in one piece with spur gear 6*s* and also has twenty teeth. So for every one rotation of the spur gear 6*s* and worm gear 7*w* about axis 8*a*, worm gear 8*w* and spur gear 7*s* rotates 20 times about axis 9*a*. Spur gear 6*s* also has 20 teeth around its periphery and is rigidly attached to worm gear 7*w*, which also has 20 teeth on it. So now, after step 4, for every one (1) rotation of the propeller 130, rotation about axis 9*a* is 160,000 revolutions (20×20×20×20).

Step 5:

Still looking at FIGS. 7 and 7A, spur gear 7*s* rotates one time for every rotation that spur gear 8*s* rotates. Spur gear 8*s* has 20 teeth on it just like spur gear 7*s* has. Worm gear 9*w* is molded in one piece with spur gear 8*s* and also has twenty teeth. So for every one rotation of the spur gear 8*s* and worm gear 9*w* about axis 10*a*, worm gear 10*w* and spur gear 9*s* rotates 20 times about axis 11*a*. Spur gear 8*s* also has 20 teeth around its periphery and is rigidly attached to worm gear 9*w*, which also has 20 teeth on it. So now, after step 5, for every one (1) rotation of the propeller 130, rotation about axis 11*a* is 3,200,000 revolutions (20×20×20×20×20).

That rotational speed of 3,200,000 rotations of the propeller 130 for every 1 rotation of the take-up or gathering roll 210, is merely passed on by having idler spur gears 10*si*, 11*si* and 12*si*, spur gear 12*si* being rigidly attached to the shaft 210*a* of the take-up spool 210. Idler spur gears 10*si*, 11*si* and 12*si* all have 20 teeth on them. The only reason for having idler gears 10*si* and 11*si* is to space the propeller more to the left from the take up roll 210 in FIGS. 7 and 7A, thereby putting the propeller closer to the center of the duct in which it is disposed. It is to be understood that, within the scope of this invention, other gearing arrangements can be used, such as gears of other configurations with more or less teeth than disclosed herein in the preferred embodiment.

The gears identified above used in steps 2-4 are duplications of each other for each step.

Figure 8:
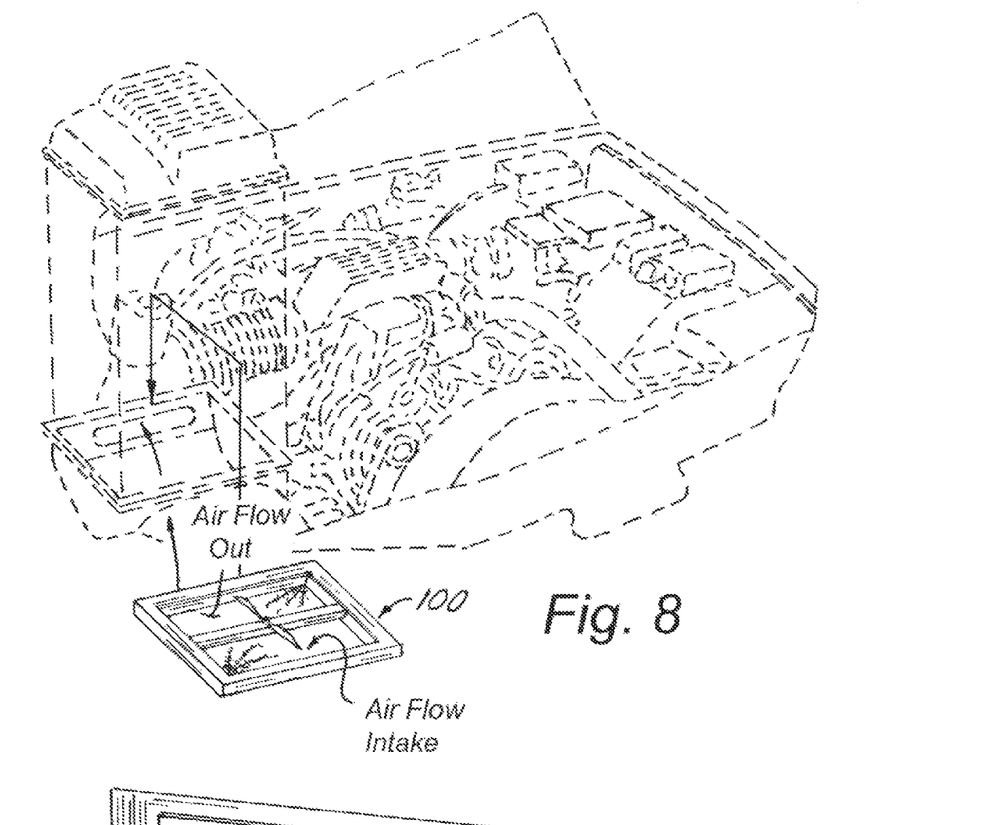
FIG. 8 shows a perspective view of a self-renewing air filter assembly inside an air passageway for a automobile engine, the automobile engine parts in dashed lines showing the environment of the present invention.

An additional environment for use of the present invention is shown in FIG. 8 wherein the improved filter apparatus 100 is used in an automotive air filtering system, the environment being shown in dashed lines. Some of the possible applications for the present invention are: air filters for heating, ventilating, and air conditioning; paint booths; engine air filters for gas turbines, diesel and gasoline engines; and cabin air in automobiles. Other applications are conceivable, and are not limited to air filtration. Any fluid (liquid or gas) may be filtered in this fashion.

Figure 9:
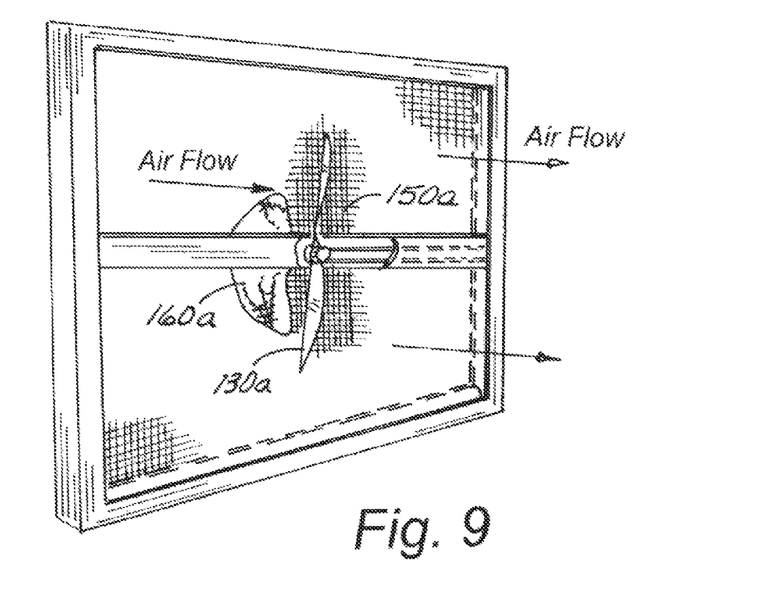
FIG. 9 shows a perspective view of an alternate embodiment of a self-renewing air filter assembly where the propeller is downstream of the filter material, instead of upstream from it as in the FIG. 1-8 embodiment.

FIG. 9 shows a perspective view of an alternate embodiment of a self-renewing air filter assembly where the propeller 130*a* is downstream of the filter material 160*a* and screen 150*a*, instead of upstream from it as in the FIG. 1-8 embodiment.

The above embodiment is the preferred embodiment, but this invention is not limited thereto. The illustrations show a fixture with both the gathering and dispensing rolls on the same end of the frame. This invention is not limited to this configuration. Acceptable orientations are not restricted to those illustrated. It has, therefore, been made obvious that many modifications and variations of the present invention are possible in light of the above teachings. It is, therefore, to be understood that within the scope of the appended claims, the invention may be practiced otherwise than as specifically described.

I claim:

1. A method for renewing a sheet-type filtering material exposed to a flowing gas stream inside a conduit, said method comprising:
   (a) loading the sheet-type filtering material in a filter assembly with a supply of unused sheet-type filter material on a first side of the filter assembly and a leading edge of the sheet-type filter material on a second side of the filter assembly, across from the first side, so that a portion of the sheet-type filtering material is in a position to filter a flowing gas stream that traverses the filter assembly, the filter assembly receiving a propeller placed to allow a flowing gas stream traversing the filter assembly to rotate the propeller and a propeller shaft connected to the propeller to convert energy from the flowing gas stream traversing the filter assembly to rotational energy on the propeller shaft;
   (b) placing the filter assembly loaded with sheet-type filtering material into a conduit used for conveying a flowing gas stream such that that at least some of the flowing gas stream that will be forced through the conduit will traverse the filter assembly, including traversing the portion of the sheet-type filtering material in the position to filter the flowing gas stream; and
   (c) converting energy from the flowing gas stream that traverses the filter assembly through use of the propeller, and using at least a portion of the converted energy to indirectly drive a gear which drags the sheet-type filtering material across the filter assembly from the first side to the second side, whereby the portion of the at sheet-type filtering material in the position to filter the flowing gas stream traversing the filter assembly changes as long as a flowing gas stream traverses the filter assembly and the supply of unused filter type material is not exhausted.

2. The method of claim 1 wherein the at least the portion of the converted energy is used to indirectly drive the gear and the gear is attached to a roller to drag the sheet-type filtering material across the filter assembly.

3. The method of claim 1 wherein a gear box converts rotational energy on the propeller shaft to a lower speed/higher torque form which is then ultimately used to drive the gear which drags the sheet-type filtering material across the filter assembly.

4. The method of claim 1 wherein the propeller shaft is connected indirectly to the gear that is driven to drag the sheet-type filtering material across the filter assembly via a combination of a series of gears to convert the rotational energy of the propeller shaft to a slower speed and a flexible belt used to transmit energy.

5. The method of claim 1 wherein the propeller is operably attached on a first axis of rotation that is positioned substantially in-line to a direction for the flowing gas stream traversing the filter assembly.

* * * * *